US011890612B2

(12) United States Patent
Weng et al.

(10) Patent No.: US 11,890,612 B2
(45) Date of Patent: Feb. 6, 2024

(54) AUTOMATED PIPETTING EQUIPMENT, MULTI-CHANNEL PIPETTING ASSEMBLY, AND PIPETTING STRUCTURE

(71) Applicant: Wistron Corporation, New Taipei (TW)

(72) Inventors: Chi-Neng Weng, New Taipei (TW); Chih-Kuan Lin, New Taipei (TW); Shao-Wei Peng, New Taipei (TW); Chih-Ying Chu, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 252 days.

(21) Appl. No.: 17/302,271

(22) Filed: Apr. 29, 2021

(65) Prior Publication Data

US 2022/0250051 A1 Aug. 11, 2022

(30) Foreign Application Priority Data

Feb. 5, 2021 (TW) ................................. 110104579

(51) Int. Cl.
*B01L 3/02* (2006.01)
*G01N 35/10* (2006.01)

(52) U.S. Cl.
CPC ........ *B01L 3/0217* (2013.01); *G01N 35/1065* (2013.01); *B01L 2200/025* (2013.01); *B01L 2200/14* (2013.01); *B01L 2400/0478* (2013.01)

(58) Field of Classification Search
CPC ............. B01L 3/0217; B01L 2200/025; B01L 2200/14; B01L 2400/0478; G01N 35/1065
See application file for complete search history.

(56) References Cited

U.S. PATENT DOCUMENTS

| 2009/0131829 | A1* | 5/2009 | Freeman | .......... | A61B 5/150343 |
| | | | | | 600/583 |
| 2014/0112839 | A1* | 4/2014 | Richardson | ........ | G01N 35/0099 |
| | | | | | 422/511 |
| 2014/0199216 | A1* | 7/2014 | Moriarty | ............... | B01L 3/0217 |
| | | | | | 422/522 |
| 2019/0120869 | A1* | 4/2019 | Belz | ....................... | G01N 35/04 |

* cited by examiner

*Primary Examiner* — Jill A Warden
*Assistant Examiner* — Alex Ramirez
(74) *Attorney, Agent, or Firm* — McClure, Qualey & Rodack, LLP (57) ABSTRACT

A multi-channel pipetting assembly includes a linkage member and a plurality of pipetting structures arranged in parallel. Each pipetting structure includes a pipette body, a piston rod, a piston tube, and an elastic element. The pipette body has a plurality of air chambers with different inner diameters, and the air chambers are arranged axially and communicate with each other. The piston rod is fixed to the linkage member. The piston tube is sleeved on the piston rod. The piston rod and the piston tube are located in the pipette body, and are axially and reciprocatingly movable in the pipette body. The piston rod matches the air chamber with the smallest inner diameter, and the piston tube matches the remaining air chambers. The elastic element is telescopically sleeved on the piston rod and corresponds to the piston tube. Therefore, a plurality of volume ranges meeting the accuracy requirements can be provided.

17 Claims, 11 Drawing Sheets

AUTOMATED PIPETTING EQUIPMENT, MULTI-CHANNEL PIPETTING ASSEMBLY, AND PIPETTING STRUCTURE

CROSS-REFERENCE TO RELATED APPLICATION

This non-provisional application claims priority under 35 U.S.C. § 119(a) to Patent Application No. 110104579 filed in Taiwan, R.O.C. on Feb. 5, 2021, the entire contents of which are hereby incorporated by reference.

BACKGROUND

Technical Field

The present invention relates to the structural design of pipettes, and in particular, to automated pipetting equipment, a multi-channel pipetting assembly, and a pipetting structure.

Related Art

A pipette is a tool for quantitatively transferring liquids. Nowadays, pipettes have been widely used in various biochemical analyses. During a biochemical analysis, test or experiment, experiment personnel generally complete the sucking and dipping of a sample or a reagent by operating a pipette manually. However, the experiment personnel need to replace pipettes that support different volume ranges to pipette small volumes of liquids (such as 1 μl to 50 μl) and large volumes of liquids (such as 10 μl to 200 μl) individually.

In addition, when many test items are involved, significant effort is required to add samples. Therefore, automated equipment enables the experiment personnel to perform high-throughput, high-efficiency, and easy-to-operate analysis operations. For example, the experiment personnel only need to set up the automated equipment, and the sample addition action required in the biochemical analysis test process is performed by the automated equipment by operating internal pipetting structures thereof according to set values. However, in order to provide pipetting operations with different volume ranges, the experiment personnel need to set the automated equipment to a shutdown mode, and then manually change the specification of the pipette installed in the automated equipment.

Therefore, regardless of whether a manual operation or an automated instrument, it is necessary to replace pipettes of different specifications to achieve pipetting operations with different volume ranges.

SUMMARY

In view of this, the present invention provides automated pipetting equipment, a multi-channel pipetting assembly, and a pipetting structure, which have a multiple-accuracy pipetting volume range to expand the volume range that meets the accuracy requirements, thereby avoiding assembling times and/or assembling errors for replacing pipettes by a user, and improving sample addition efficiency.

In an embodiment, automated pipetting equipment is adapted for pipetting between a plurality of workbenches. The automated pipetting equipment includes a movable mechanism, a multi-channel pipetting assembly, and a driving module. The movable mechanism is adapted to move between any two of the plurality of workbenches. The multi-channel pipetting assembly is disposed on the movable mechanism and includes a bracket, a linkage member, and a plurality of pipetting structures. The bracket is disposed on the movable mechanism. The pipetting structures are arranged on the bracket and the linkage member in parallel, and each of the pipetting structures includes a pipette body, a piston rod, at least one piston tube, and at least one elastic element. The pipette body is disposed on the bracket. The pipette body has a plurality of air chambers with different inner diameters, and the air chambers are arranged axially according to the inner diameter and communicate with each other. The piston rod is fixed to the linkage member, located in the pipette body, and axially and reciprocatingly movable in the pipette body. The piston tube is located in the pipette body, is axially and reciprocatingly movable in the pipette body, and is sleeved on the piston rod. The piston rod matches the air chamber with a smallest inner diameter, and the at least one piston tube matches the remaining air chambers. The at least one elastic element respectively corresponds to the at least one piston tube and is telescopically sleeved on the piston rod. The driving module is disposed on the movable mechanism and adapted to drive the linkage member to axially reciprocate.

In an embodiment, a multi-channel pipetting assembly is provided, including a linkage member and a plurality of pipetting structures. The pipetting structures are arranged on the linkage member in parallel, and each of the pipetting structures includes a pipette body, a piston rod, at least one piston tube, and at least one elastic element. The pipette body has a plurality of air chambers with different inner diameters, and the air chambers are arranged axially according to the inner diameter and communicate with each other. The piston rod is fixed to the linkage member, and axially and reciprocatingly movable in the pipette body. The piston tube is located in the pipette body, is axially and reciprocatingly movable in the pipette body, and is sleeved on the piston rod. The piston rod matches the air chamber with a smallest inner diameter, and the at least one piston tube matches the remaining air chambers. The at least one elastic element respectively corresponds to the at least one piston tube and is telescopically sleeved on the piston rod.

In an embodiment, a pipetting structure is provided, including a pipette body, a piston rod, at least one piston tube, and at least one elastic element. The pipette body has an air chamber, and an inner diameter of the air chamber decreases in an axial direction. The piston rod is located in the pipette body, is axially and reciprocatingly movable in the pipette body, and matches a part of the air chamber. The piston tube is located in the pipette body, is c axially and reciprocatingly movable in the pipette body, and is sleeved on the piston rod. A piston section matches a remaining part of the air chamber. The at least one elastic element respectively corresponds to the at least one piston tube and is telescopically sleeved on the piston rod.

DETAILED DESCRIPTION

Figure 1:
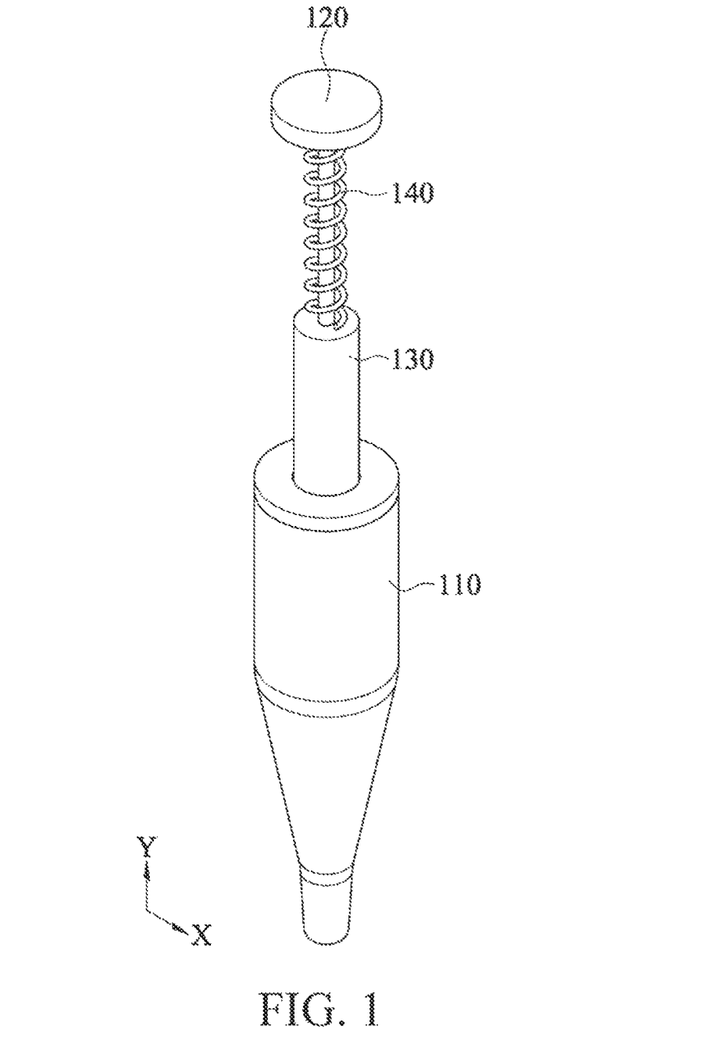
FIG. 1 is a three-dimensional schematic diagram of a pipetting structure according to an embodiment.
Figure 2:
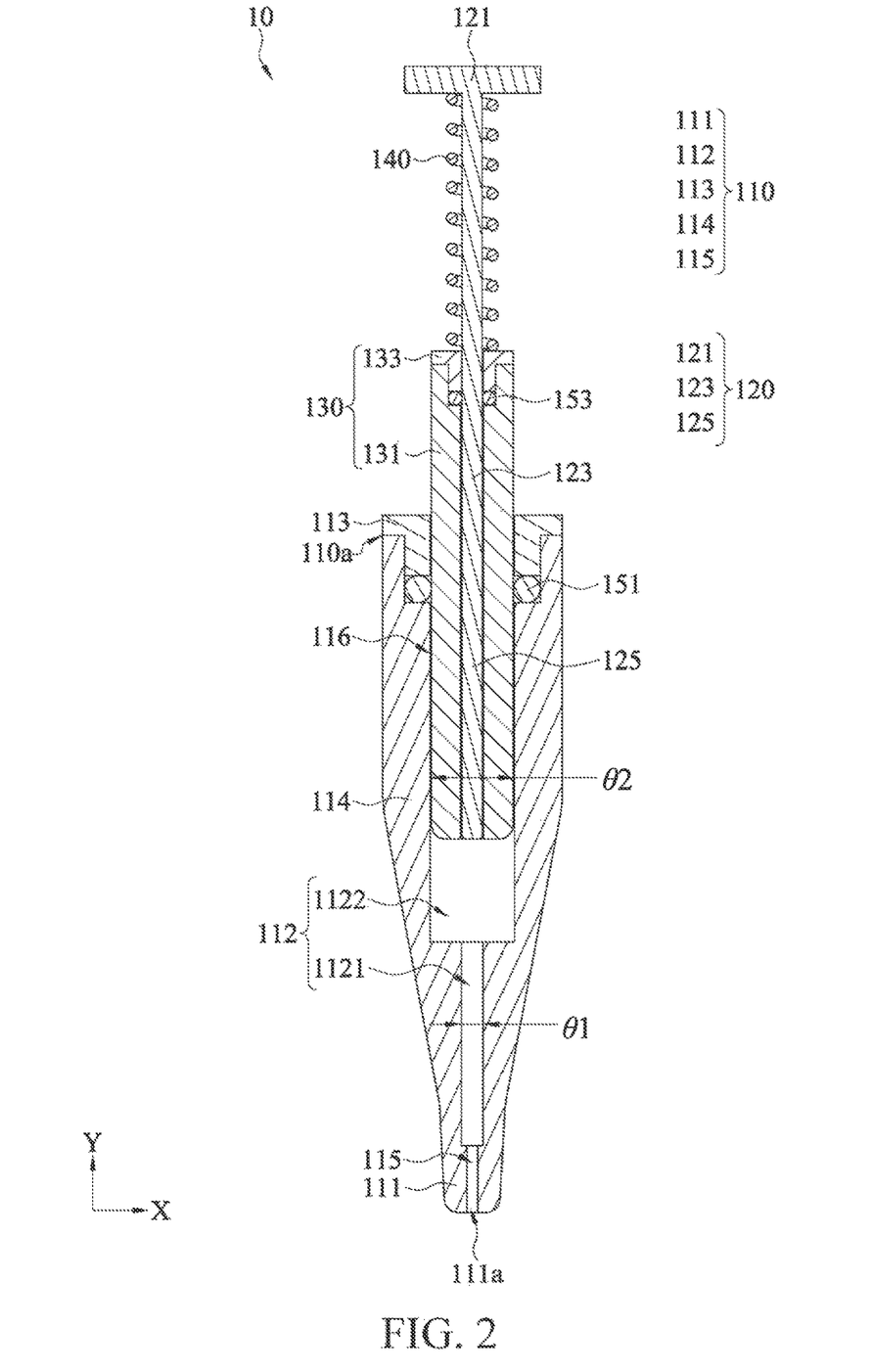
FIG. 2 is a schematic cross-sectional view of the pipetting structure of FIG. 1 in an axial direction and a radial direction.

Referring to FIG. 1 and FIG. 2, a pipetting structure 10 includes: a pipette body 110, a piston rod 120, one or more piston tubes 130, and one or more elastic elements 140.

The pipette body 110 has a plurality of air chambers 112 with different inner diameters θ1, θ2, and the air chambers 112 are arranged in an axial direction Y according to the inner diameters θ1, θ2 thereof and communicate with each other. Specifically, the air chambers 112 have different volumes, and the air chambers 112 are arranged in order according to the volumes. In some embodiments, a lower end of the pipette body 110 (that is, an air outlet end 111) has an air outlet 111a. A bottom of the air chamber 1121 with a smallest inner diameter θ1 of the air chambers 112 communicates with the air outlet 111a, and a top of the air chamber 1121 with the smallest inner diameter θ1 communicates with a bottom of the air chamber 1122 with the second smallest inner diameter θ2. Similarly, the top of the air chamber 1122 with the second smallest inner diameter θ2 communicates with a top of the air chamber with the third smallest inner diameter (not shown in the figure), and so on.

The inner diameter θ1 (or θ2) of each of the air chambers 112 may be an average inner diameter or the maximum inner diameter of the air chamber 112. In some embodiments, each of the air chambers 112 may be cylindrical with the same inner diameter (hereinafter referred to as an equal inner diameter) from the top (that is, away from the air outlet end 111) to the bottom (that is, close to the air outlet end 111). In other words, inner diameters of the same air chamber 112 passing through different positions of a central axis are approximately the same, and the inner diameter θ1, θ2 of each of the air chambers 112 is a diameter of the cylinder, as shown in FIG. 1 and FIG. 2. In some other embodiments, each of the air chambers 112 may be cylindrical with an equal inner diameter, and a cross-section of each of the air chambers 112 substantially perpendicular to the central axis is an arbitrary polygon (such as a triangle, a quadrilateral, a pentagon, or the like, which are not shown). Here, the inner diameter θ1, θ2 of the air chamber 112 refer to the maximum distance (that is, the maximum inner diameter) from one side of the polygon through the center of the polygon to the other side, or refer to an average distance (that is, an average inner diameter) of a plurality of distances from one side of the polygon through the center of the polygon to the other side. In this case, the air chambers 112 are respectively arranged based on the maximum distance or the average distance obtained in the same manner. In still some other embodiments, each of the air chambers 112 may have a cylindrical shape that tapers down from top (that is, away from the air outlet end 111) to the bottom (that is, close to the air outlet end 111), and the cross-section of each of the air chambers 112 substantially perpendicular to the central axis is circular. Here, the inner diameter θ1, θ2 of the air chamber 112 refer to an average diameter (that is, an average inner diameter) of the diameters passing through the different positions of the central axis, or the maximum diameter (that is, the maximum inner diameter) of the diameters passing through the different positions of the central axis. In this case, the air chambers 112 are respectively arranged in an axial direction Y based on the maximum diameter or the average diameter obtained in the same manner. In yet some other embodiments, each of the air chambers 112 may have a cylindrical shape that tapers down from top (that is, away from the air outlet end 111) to the bottom (that is, close to the air outlet end 111), and the cross-section of each of the air chambers 112 substantially perpendicular to the central axis is an arbitrary polygon. Here, the inner diameter θ1, θ2 of the air chamber 112 refer to an average value or the maximum one (that is, the maximum inner diameter) of a plurality of maximum distances through different positions of the central axis from one side of the polygon through the center of the polygon to the other side, or refer to a mean (that is, an average inner diameter) of a plurality of distances through different positions of the central axis from one side of the polygon through the center of the polygon to the other side. In this case, the air chambers 112 are respectively arranged based on the maximum inner diameter or the average inner diameter obtained in the same manner. In an example, side walls of different air chambers 112 may discontinuously taper down, that is, the side walls of two adjacent air chambers 112 are directly connected to a bottom wall of the air chamber 112 not on an upper side. In another example, side walls of different air chambers 112 may continuously taper down, that is, the side walls of two adjacent air chambers 112 are directly connected. In other words, the side walls of these air chambers 112 are directly connected in sequence to form a single air chamber with a completely oblique or a completely curved side wall. In this case, the air chambers 112 refer to different parts of a single air chamber.

The piston rod 120 is located in the pipette body 110 and can reciprocate in the axial direction Y, that is, the piston rod 120 can reciprocate up and down in the pipette body 110. The piston rod 120 includes a fixing section 121, a connecting section 123, and a piston section 125 that are coupled in sequence. In other words, the connecting section 123 is coupled between the piston section 125 and the fixing section 121. Here, the piston section 125 matches the air chamber 1121 with the smallest inner diameter θ1, and is adapted to push air out or draw up air into the air chamber 1121 matching the piston section. In other words, an outer diameter of the piston section 125 is substantially equal to the inner diameter θ1 of the air chamber 1121 matching the piston section, and the piston section 125 can reciprocate in the axial direction Y in the air chamber 1121. For example, when the piston section 125 moves from the top of the air chamber 1121 to contact the bottom of the air chamber 1121 in the axial direction Y, the piston section 125 pushes the air in the air chamber 1121 out of the air chamber. When the piston section 125 moves from the bottom of the air chamber 1121 to contact the top of the air chamber 1121 in the axial direction Y, the air is drawn up into the air chamber 1121. In other words, a distance that each of the piston sections 125 moves in the air chamber 1121 matching the piston section corresponds to an amount of air that is drawn up.

The piston tube 130 is reciprocatingly movable in the pipette body 110 in the axial direction Y, and is capable of being telescopically sleeved on the piston rod 120 in the axial direction Y. In some embodiments, when three or more air chambers 112 are provided, a plurality of piston tubes 130 are provided. In this case, the piston tubes 130 respectively match the remaining air chambers 1122 of the air chambers 112, and are sequentially sleeved from inside (that is, adjacent to the piston rod 120) to outside. In another embodiment, when two air chambers 112 are provided, one piston tube 130 is provided. The piston tube 130 matches the air chamber 1122 with the second smallest inner diameter θ2.

Here, each of the piston tubes 130 is adapted to push air out of or draw up air into the air chamber 1122 matching the piston tube. In other words, an outer diameter of the piston tube 130 is substantially equal to the inner diameter θ2 of the air chamber 1122 matching the piston tube, and the piston tube 130 can reciprocate in the axial direction Y in the air chamber 1122. For example, when the piston tube 130 moves, in the axial direction Y, from the top of the air chamber 1122 matching the piston tube to contact the bottom of the air chamber 1122, the piston tube 130 pushes the air in the air chamber 1122 out of the air chamber 1122. When the piston tube 130 moves from the bottom of the air chamber 1122 matching the piston tube to the top of the air chamber 1122 in the axial direction Y, the air is drawn up into the air chamber 1122. In other words, a distance that each of the piston tubes 130 moves in the air chamber 1122 matching the piston tube corresponds to an amount of air that is drawn up.

The elastic element 140 is telescopically sleeved on the piston rod 120. In some embodiments, when a plurality of piston tubes 130 are provided, a plurality of elastic elements 140 are provided. Here, the elastic elements 140 correspond to the piston tubes 130 in a one-to-one manner. In another embodiment, when one piston tube 130 is provided, one elastic element 140 is provided, and the elastic element 140 corresponds to the piston tube 130.

Here, one end of the elastic element 140 is fixed to the fixing section 121 of the piston rod 120, and the other end of the elastic element 140 is fixed to a top of the corresponding piston tube 130. In an example, the elastic element 140 may be a spring.

In some embodiments, initial tension of each of the elastic elements 140 is greater than a frictional force between an outer wall of the corresponding piston tube 130 and a surface (that is, an inner wall of the pipette body 110 in contact with the outer wall) in contact with the outer wall. In addition, initial tension of each of the elastic elements 140 is also greater than a frictional force between an inner wall of the corresponding piston tube 130 and a surface (that is, the outer wall of the adjacent piston rod 120 or the outer wall of the adjacent piston tube 130) in contact with the inner wall. Therefore, each of the piston tubes 130 can move with the piston rod 120 from the bottom of the air chamber 112 corresponding to the piston tube 130 to the top of the air chamber 112 corresponding to the piston tube 130 in the axial direction Y without staying in place or moving slower than the piston rod 120 due to the elastic element 140 corresponding to the piston tube 130 being stretched (that is, a lower end of the piston rod 120 retracts into the piston tube 130).

Moreover, an elastic force of each of the elastic elements 140 is greater than a frictional force between the outer wall of the corresponding piston tube 130 and a surface (that is, an inner wall of the pipette body 110 in contact with the outer wall) in contact with the outer wall. In addition, the elastic force of each of the elastic elements 140 is also greater than a frictional force between an inner wall of the corresponding piston tube 130 and a surface (that is, the outer wall of the adjacent piston rod 120 or the outer wall of the adjacent piston tube 130) in contact with the inner wall. Therefore, each of the piston tubes 130 can move with the piston rod 120 from the top of the air chamber 112 corresponding to the piston tube 130 to the bottom of the air chamber 112 corresponding to the piston tube 130 in the axial direction Y without staying in place or moving slower than the piston rod 120 due to the elastic element 140 corresponding to the piston tube 130 being retracted (that is, the lower end of the piston rod 120 protrudes from the lower end of the piston tube 130).

In other words, when the lower end of the piston rod 120 moves in the air chamber 112 corresponding to any of the piston tubes 130, the elastic element 140 fixed to the piston tube 130 maintains an original length.

In some embodiments, a sealing member 151 is provided between an outermost side of the piston tube 130 and an inner wall of the pipette body 110. In some embodiments, the sealing member 151 is fixed to an upper end 110a of the pipette body 110 with a sealing cover 113.

In some embodiments, the pipette body 110 includes an air displacement tube 114 and an air outlet end 111. A bottom end of the air outlet end 111 has an air outlet 111a, and the air displacement tube 114 is engaged with a top end of the air outlet end 111. An air outlet passage 115 penetrates the air outlet end 111 in the axial direction Y. A receiving passage 116 and the air chamber 112 penetrate the air replacement tube 114 in the axial direction Y. A lower end of the air outlet channel 115 is an air outlet 111a, and an upper end of the air outlet channel 115 communicates with a lower end of the lowermost air chamber 112. A lower end of the receiving passage 116 communicates with an upper end of the uppermost air chamber 112. For example, the two air chambers 1121 and 1122 are used as an example. The upper end of the air outlet channel 115 communicates with a lower end of the air chamber 1121. The lower end of the receiving passage 116 communicates with an upper end of the air chamber 1122.

In some embodiments, the sealing member 151 may be embedded on an inner surface of the pipette body 110 and slightly protrude from the inner surface of the pipette body 110. In some embodiments, the sealing member 151 may alternatively be embedded on an outer surface of the corresponding piston tube 130 and slightly protrude from the outer surface of the piston tube 130.

In an embodiment, when only one piston tube 130 is provided for the pipetting structure 10, a sealing member 153 is provided between the piston tube 130 and the piston rod 120. In some embodiments, when a plurality of piston tubes 130 are provided for the pipetting structure 10, a sealing member 153 is provided between any two of the piston tubes 130 and the piston rod 120 that are adjacent to each other.

In some embodiments, each of the piston tubes 130 includes a piston body 131 and a cover body 133. Here, the cover body 133 fixes the sealing member 153 to the piston body 131.

In some embodiments, the sealing member 153 may be embedded on an inner surface of the corresponding piston tube 130 and slightly protrude from the inner surface of the piston tube 130. In some embodiments, the sealing member 153 may be embedded on an outer surface of the piston rod 120 and slightly protrude from the outer surface of the piston rod 120.

In some embodiments, each of the sealing members 151, 153 may be a sealing ring.

Figure 3:
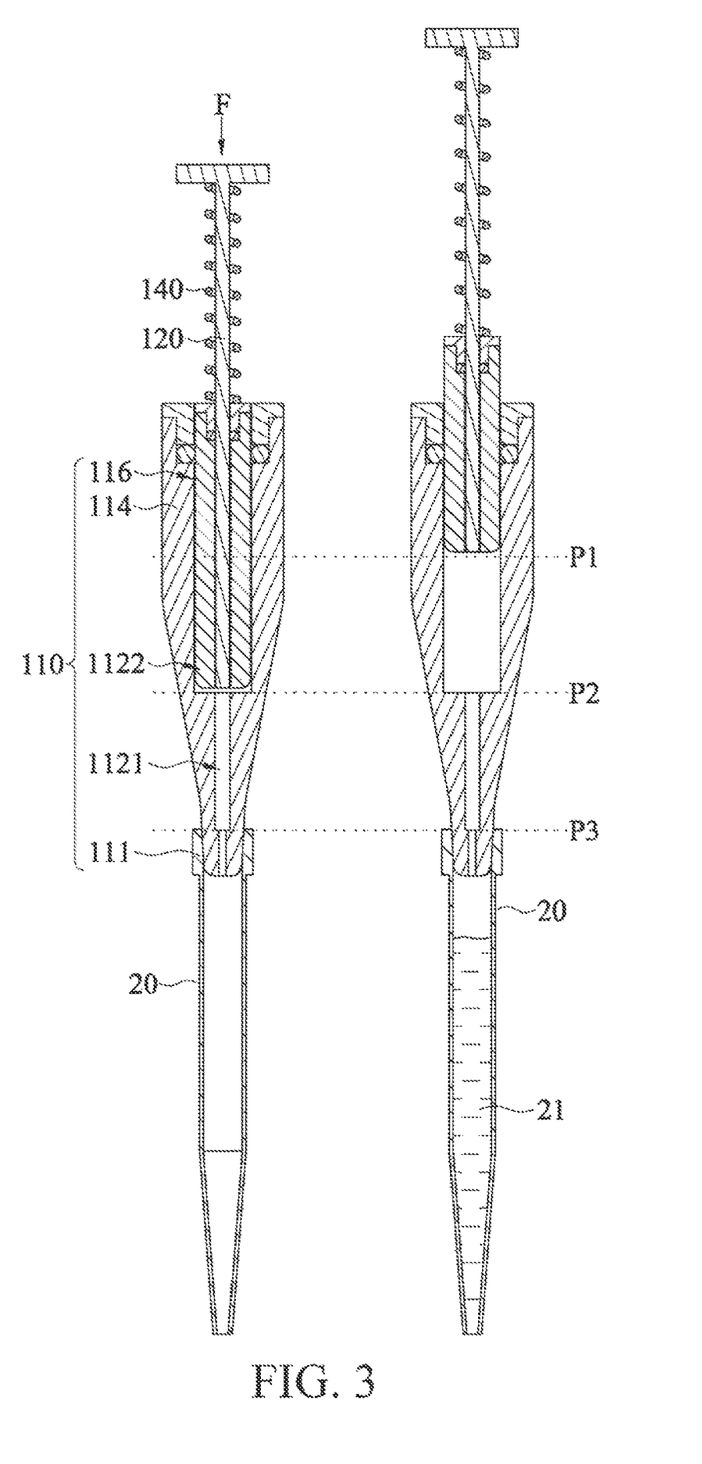
FIG. 3 is a schematic diagram of an operation mode of the pipetting structure of FIG. 2.
Figure 4:
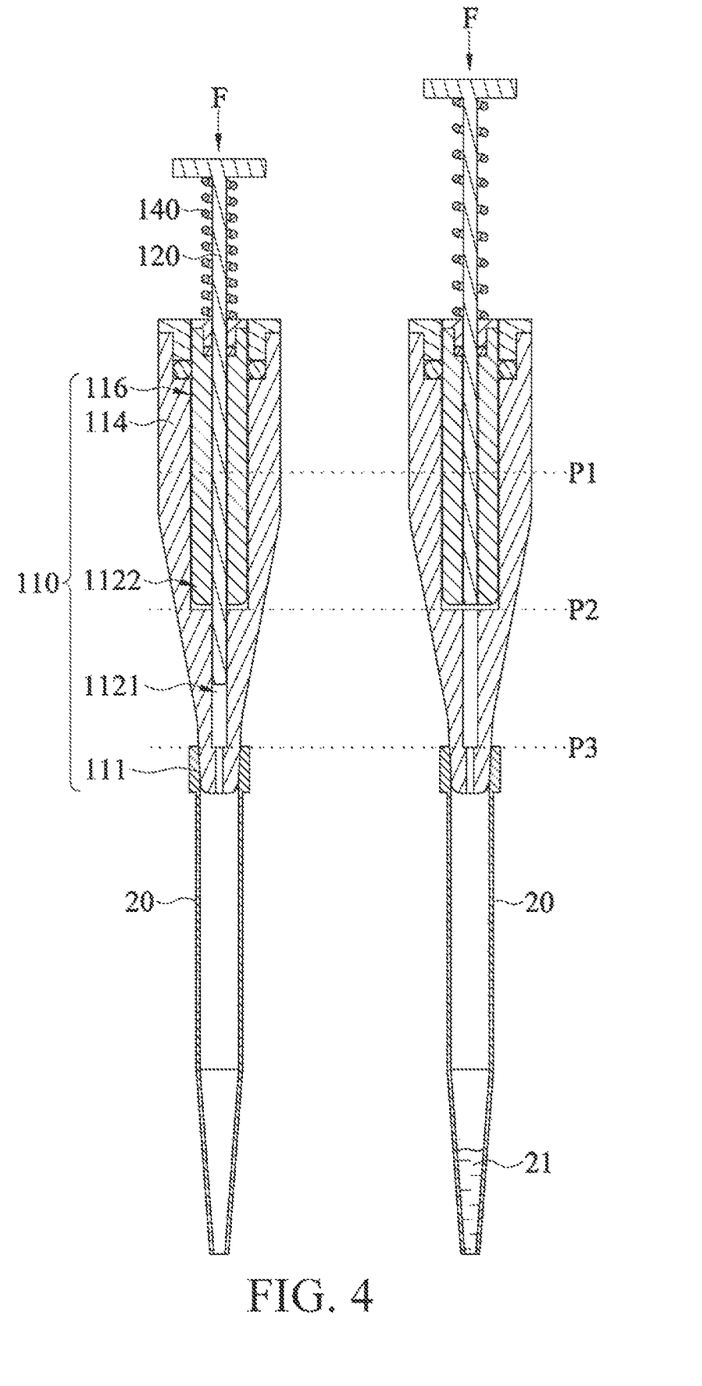
FIG. 4 is a schematic diagram of another operation mode of the pipetting structure of FIG. 2.

The two air chambers 1121 and 1122 are used as an example. When the pipetting structure 10 is in an initial state, front sections of the piston rod 120 and the piston tube 130 are accommodated in the receiving passage 116. In this case, the lower end of the piston rod 120 and the lower end of the piston tube 130 are located at a first position P1. Referring to FIG. 3 and FIG. 4, a tip 20 can be sleeved on outside of the air outlet end 111.

Referring to FIG. 1 to FIG. 3, when an external force F is continuously applied to the fixing section 121 of the piston rod 120, the piston rod 120 moves downward in the axial direction Y together with the piston tube 130, so that the lower end of the piston rod 120 and the lower end of the piston tube 130 move from the first position P1 to a second position P2. That is, the lower end of the piston rod 120 and the lower end of the piston tube 130 move from the top of the air chamber 1122 to the bottom of the air chamber 1122, as shown in FIG. 3 (a left side view).

In this case, the lower end of the piston rod 120 and the lower end of the piston tube 130 are maintained at the second position P2, a bottom end of the tip 20 is placed in liquid 21 to be drawn up, and then the external force F is slowly released. As the external force F is slowly released, the piston rod 120 and the piston tube 130 move upward in the axial direction Y, so that the lower end of the piston rod 120 and the lower end of the piston tube 130 return to the first position P1 from the second position P2. That is, the lower end of the piston rod 120 and the lower end of the piston tube 130 move from the bottom of the air chamber 1122 to the top of the air chamber 1122 to draw back the air into the air chamber 1122, thus drawing up the liquid 21 of a first volume corresponding to the volume of the air chamber 1122 into the tip 20, as shown in FIG. 3 (a right side view).

For example, assuming that the first volume is 200 µl, a distance from the bottom to the top of the air chamber 1122 is divided into 200 sub-locations. In this case, when the piston rod 120 and the piston tube 130 reciprocate 1 sub-location in the air chamber 1122 in the axial direction Y, the pipetting structure 10 can draw up 1 µl of the liquid 21 into the tip 20. Similarly, when the piston rod 120 and the piston tube 130 reciprocate 2 sub-locations in the air chamber 1122 in the axial direction Y, the pipetting structure 10 can draw up 20 µl of the liquid 21 into the tip 20. In other words, the minimum increment of the drawing amount of the liquid 21 caused by the piston action in the air chamber 1122 is 1 µl.

After the pipetting structure 10 moves to an area to which a sample is to be added, the external force F is continuously applied downward again to the fixing section 121 of the piston rod 120, so that the lower end of the piston rod 120 and the lower end of the piston tube 130 move from the first position P1 to the second position P2 again. In this case, due to the downward movement of the piston rod 120 and the piston tube 130, the air in the air chamber 1122 is pushed out of the air chamber 1122 again, and then the liquid 21 in the tip 20 is pushed out of the tip 20 to achieve an action of pipetting.

Referring to FIG. 1, FIG. 2, and FIG. 4, when an external force F is continuously applied to the fixing section 121 of the piston rod 120, the piston rod 120 and the piston tube 130 move downward in the axial direction Y, so that the lower end of the piston rod 120 and the lower end of the piston tube 130 move from the first position P1 to the second position P2, and the lower end of the piston rod 120 is caused to protrude from the lower end of the piston tube 130 and to move from the second position P2 to a third position P3. That is, the lower end of the piston rod 120 and the lower end of the piston tube 130 move from the top of the air chamber 1122 to the bottom of the air chamber 1122, and then the lower end of the piston rod 120 continues moving from the top of the air chamber 1121 (equivalent to the bottom of the air chamber 1122) to the bottom of the air chamber 1122, as shown in FIG. 4 (a left side view). In this case, the elastic element 140 corresponding to the piston tube 130 is in a compressed state.

In this case, the lower end of the piston rod 120 is maintained at the third position P3, the bottom end of the tip 20 is placed in liquid 21 to be drawn up, and then the external force F is slowly released. As the external force F is slowly released, the piston rod 120 first moves upward in the axial direction Y, but the lower end of the piston tube 130 is maintained at the second position P2 due to the elastic force of the elastic element 140, and the release of the external force F is stopped until the lower end of the piston rod 120 returns to the second position P2 from the third position P3. That is, the lower end of the piston rod 120 moves from the bottom of the air chamber 1121 to the top of the air chamber 1121 to draw back the air into the air chamber 1121, thus drawing up the liquid 21 of a second volume corresponding to the volume of the air chamber 1121 into the tip 20, as shown in FIG. 4 (a right side view). For example, assuming that the second volume is 20 the distance from the bottom to the top of the air chamber 1121 is also divided into 200 sub-locations. In this case, when the piston rod 120 reciprocates 1 sub-location in the air chamber 1121 in the axial direction Y, the pipetting structure 10 can draw up 0.1 µl of the liquid 21 into the tip 20. Similarly, when the piston rod 120 and the piston tube 130 reciprocate two sub-locations in the air chamber 1121 in the axial direction Y, the pipetting structure 10 can draw up 0.2 µl of the liquid 21 into the tip 20. In other words, the minimum increment of the drawing amount of the liquid 21 caused by the piston action in the air chamber 1121 is 0.1 µl.

After the pipetting structure 10 moves to an area to which a sample is to be added, the external force F is continuously applied downward again to the fixing section 121 of the piston rod 120, so that the lower end of the piston rod 120 moves from the second position P2 to the third position P3 again. In this case, due to the downward movement of the piston rod 120, the air in the air chamber 1121 is pushed out of the air chamber 1121 again, and then the liquid 21 in the tip 20 is pushed out of the tip 20 to achieve an action of pipetting.

Therefore, as the inner diameter θ1, θ2 of the air chambers 112 changes in ascending order, the smallest increment of the drawing amount of the liquid 21 caused by the piston action in the air chambers 112 also changes in ascending order.

In some embodiments, a length of the piston rod 120 is greater than a length of the pipette body 110. The length of each of the piston tubes 130 is greater than a length between the bottom of the air chamber 112 corresponding to the piston tube and the top of the pipette body 110.

Figure 5:
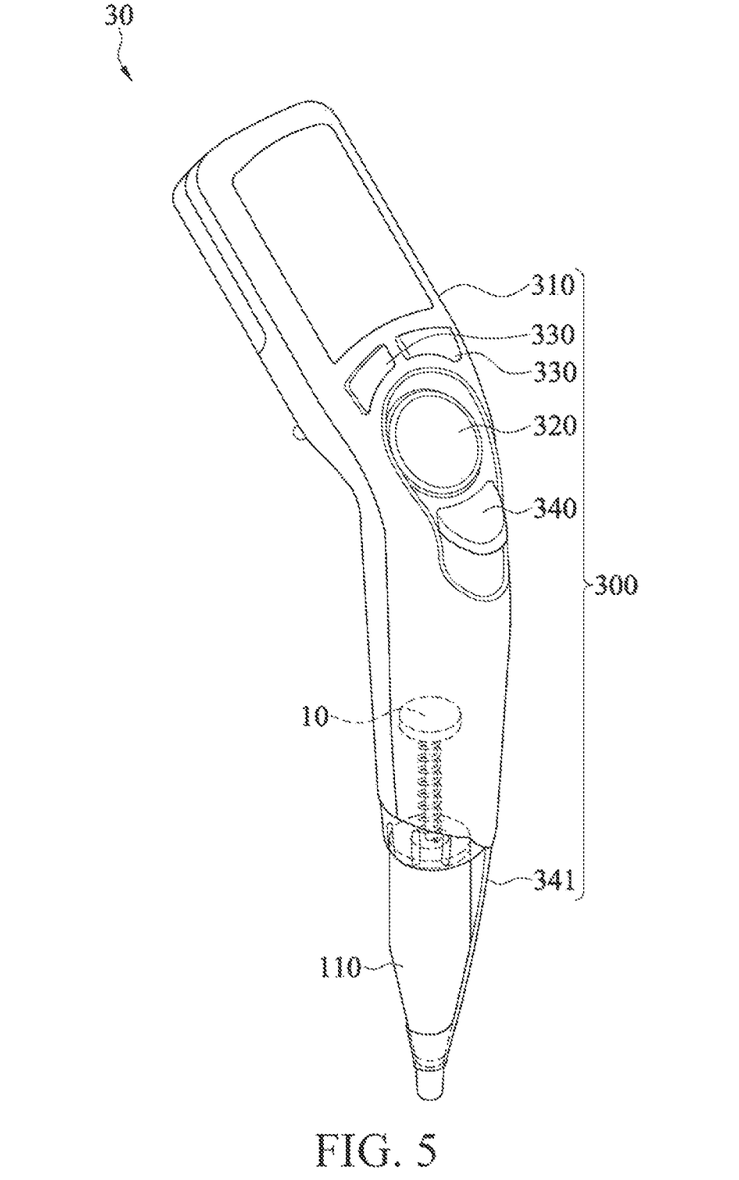
FIG. 5 is a schematic diagram of an application pattern of the pipetting structure of FIG. 1.

In some embodiments, referring to FIG. 5, the pipetting structure 10 of any of the above embodiments may be applied to a handheld single-channel pipette 30. The handheld single-channel pipette 30 may be electronic or mechanical. Referring to FIG. 1, FIG. 2, and FIG. 5, a top end of the pipette body 110 of the pipetting structure 10 is engaged with a bottom end of a housing 310 of a handheld body 300. The piston rod 120 and the piston tube 130 extend to inside of the housing 310. The handheld body 300 has an operation switch 320 (for example, an electric button, a mechanical button, or the like), and the operation switch 320 is disposed on the housing 310. The operation switch 320 is coupled to a driving module (not shown) located inside the housing 310, and the driving module may apply an external force F to the piston rod 120 of the pipetting structure 10 in response to enabling of the operation switch 320 (for example, being pressed by the user, or the like). The handheld body 300 further has an adjusting element 330 (for example, an adjusting button, an adjustment knob, or the like), and the adjusting element 330 is disposed on the housing 310. The adjusting element 330 is adapted to set the drawing amount. In an example, the driving module may apply the external force F to the piston rod 120 of the pipetting structure 10 according to a set drawing amount in response to enabling of the operation switch 320 (for example, being pressed by the user, or the like). In another example, the adjusting element 330 may be coupled to a limiting assembly (not shown) located inside the housing 310, and the limiting assembly may limit the moving position and moving distance of the piston rod 120 of the pipetting structure 10 according to the set drawing amount. The structure and operation of the limiting assembly are known to those skilled in the art, and therefore details are not described herein again. In an embodiment, the driving module may be implemented by a motor and a shaft. In another embodiment, the driving module may be implemented by a conventional mechanism assembly.

In some embodiments, the handheld body 300 also has a remover button 340 and a tip remover 341. The remover button 340 is disposed on the housing 310, and the remover button 340 is coupled to the tip remover 341. A user may press the remover button 340 to drive the tip remover 341 to separate, from the air outlet end 111, the tip 20 sheathed outside the air outlet end 111 of the pipette body 110.

Figure 6:
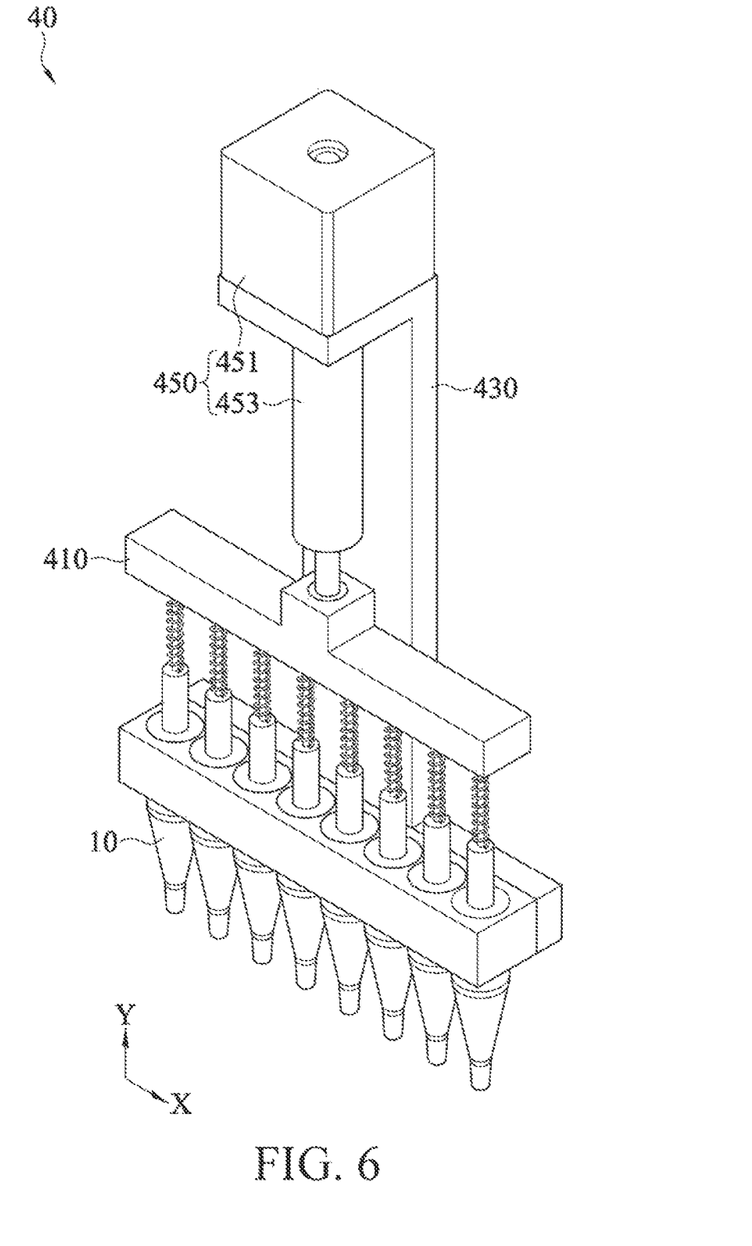
FIG. 6 is a three-dimensional schematic diagram of a multi-channel pipetting assembly according to an embodiment.
Figure 7:
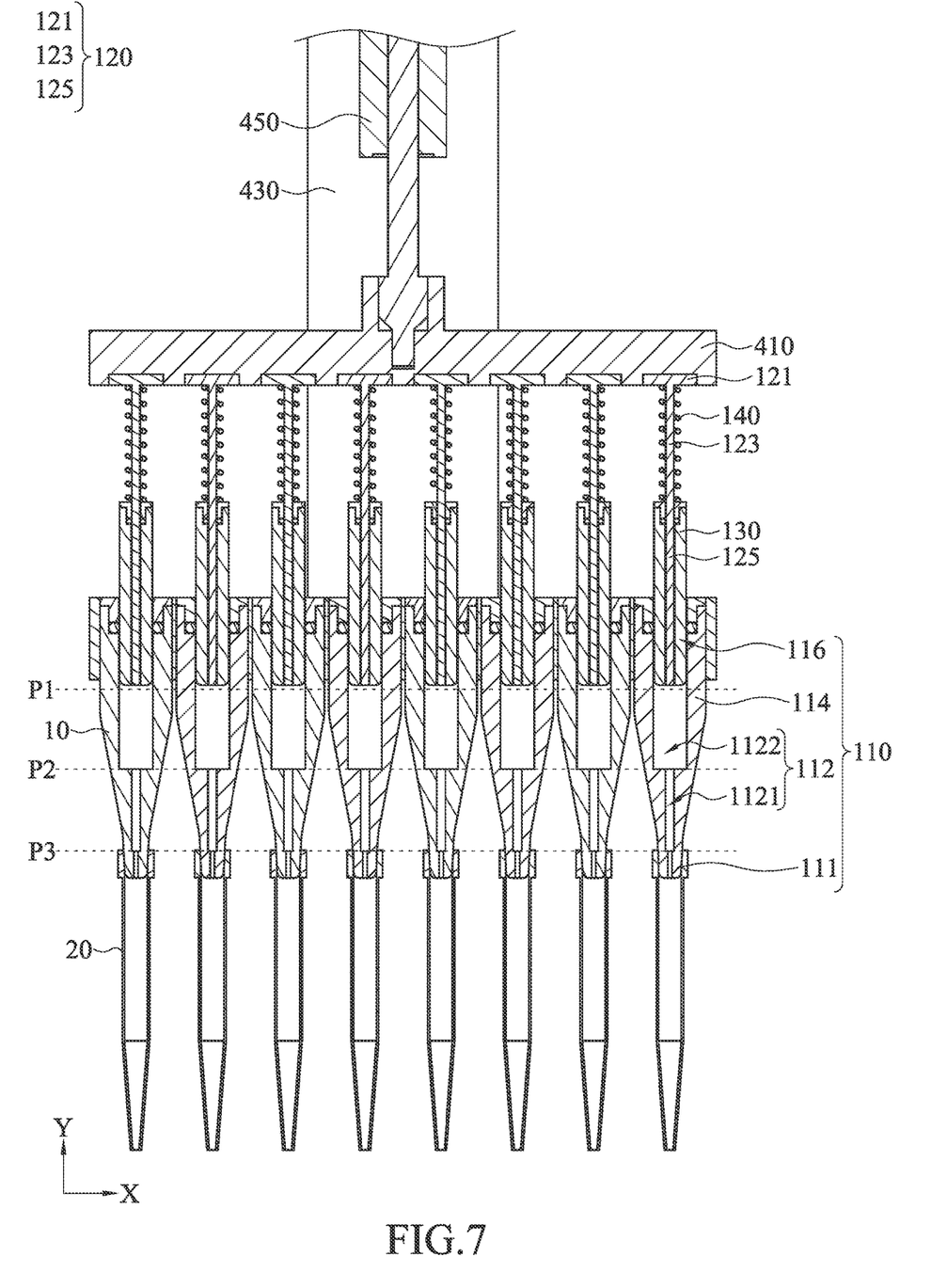
FIG. 7 is a schematic cross-sectional view of the multi-channel pipetting assembly of FIG. 6 in an axial direction and a radial direction.

In some embodiments, referring to FIG. 6 and FIG. 7, a multi-channel pipetting assembly 40 includes: a plurality of pipetting structures 10 and a linkage member 410. The pipetting structures 10 are arranged (that is, arranged in the radial direction X) on the linkage member 410, and the fixing section 121 of the piston rod 120 is fixed to the linkage member 410. Each of the pipetting structures 10 may adopt the structure of any of the above embodiments.

In some embodiments, the multi-channel pipetting assembly 40 may further include a bracket 430. The pipette bodies 110 of the pipetting structures 10 are arranged on the bracket 430 in parallel. The pipette bodies 110 of the pipetting structures 10 may be fixed in parallel on the bracket 430 at substantially the same position in the axial direction Y and at predetermined intervals.

In some embodiments, in the multi-channel pipetting assembly 40, a driving module 450 may be used to drive the linkage member 410 to reciprocate in the axial direction Y, so that the plurality of pipetting structures 10 can simultaneously achieve the actions of liquid drawing and sample addition. In an embodiment, the driving module 450 may be implemented by a motor 451 and a shaft 453. The shaft 453 is connected between the motor 451 and the linkage member 410. The motor 451 provides power to the shaft 453 to extend and contract the shaft 453. When the shaft 453 is extended, the linkage member 410 is pushed by the shaft 453 in the axial direction Y, so that the piston rod 120 and the piston tube 130 move downward in the axial direction Y. When the shaft 453 is contracted, the linkage member 410 is pulled upward by the shaft 453 in the axial direction Y, so that the piston rod 120 and the piston tube 130 move upward in the axial direction Y. In another embodiment, the driving module 450 may alternatively be implemented by a conventional mechanism assembly.

In some embodiments, the linkage member 410 may be a linkage crossbar.

Figure 8:
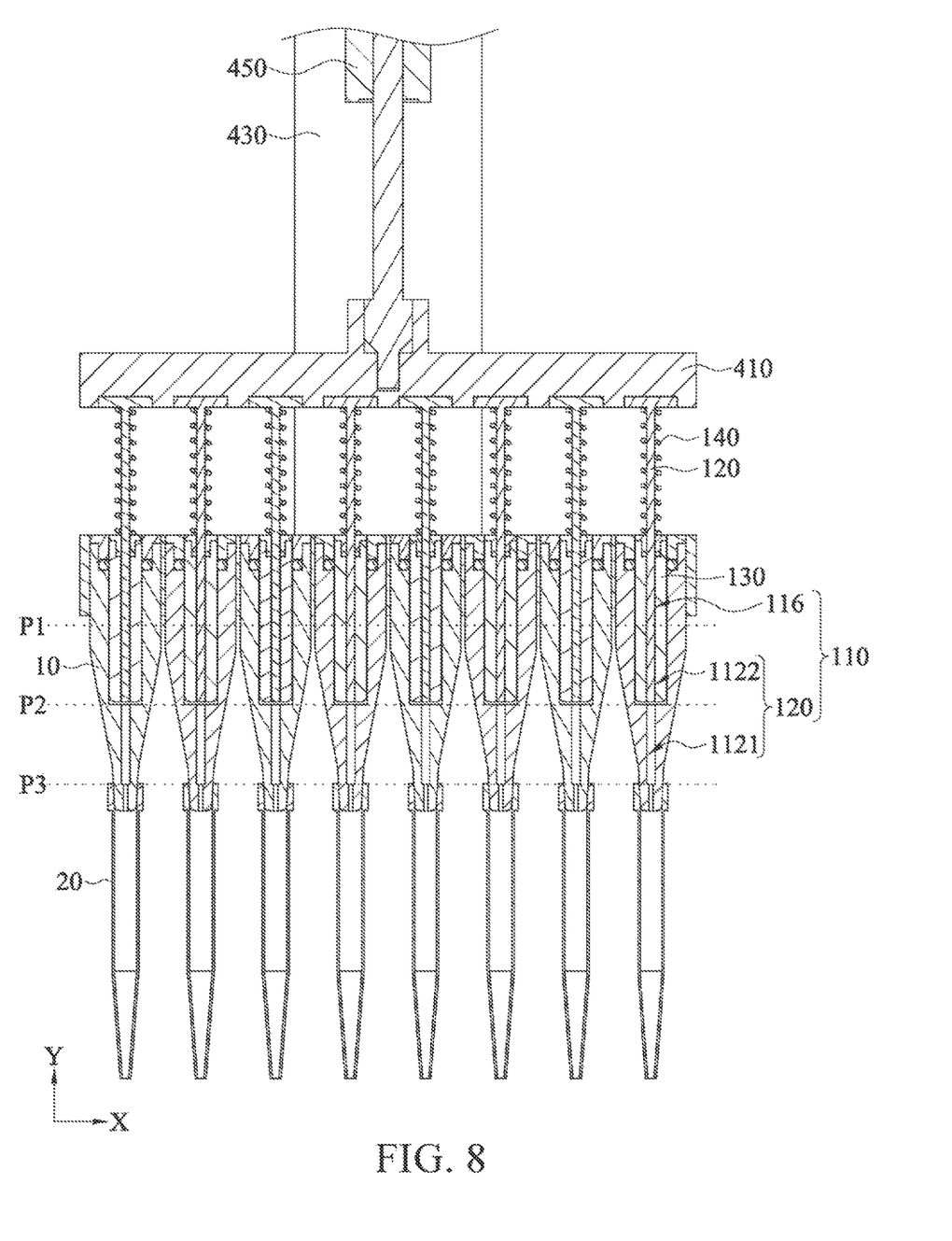
FIG. 8 is a schematic diagram of a moving pattern of the multi-channel pipetting assembly of FIG. 7.

The two air chambers 1121 and 1122 are used as an example. When all of the pipetting structures 10 of the multi-channel pipetting assembly 40 are in an initial state, front sections of the piston rod 120 and the piston tube 130 of the pipetting structure are accommodated in the receiving passage 116. In this case, the lower end of the piston rod 120 and the lower end of the piston tube 130 are located at a first position P1. Referring to FIG. 6 to FIG. 8, a tip 20 can be sleeved on outside of the air outlet end 111.

Referring to FIG. 6 to FIG. 8, when the driving module 450 continues to push the linkage member 410 in the axial direction Y, the piston rod 120 and the piston tube 130 move downward in the axial direction Y, so that the lower end of the piston rod 120 and the lower end of the piston tube 130 move from a first position P1 to a second position P2. Then, the driving module 450 maintains the linkage member 410 stationary, so that the lower end of the piston rod 120 and the lower end of the piston tube 130 are maintained at the second position P2, as shown in FIG. 8. Next, a bottom end of the tip 20 is placed in the liquid to be drawn up, and then the driving module 450 slowly pulls the linkage member 410 upward in the axial direction Y. As the linkage member 410 is slowly pulled upward in the axial direction Y, the piston rod 120 and the piston tube 130 move upward in the axial direction Y, so that the lower end of the piston rod 120 and the lower end of the piston tube 130 return to the first position P1 from the second position P2. That is, the piston rod 120 and the piston tube 130 reciprocate once between the top and the bottom of the air chamber 1122. As the lower end of the piston rod 120 and the lower end of the piston tube 130 return to the first position P1 from the second position P2 (as shown in FIG. 7), the air is drawn up back to the air chamber 1122, and therefore the liquid of a first volume corresponding to the volume of the air chamber 1122 is drawn up into the tip 20. After the multi-channel pipetting assembly 40 moves to an area to which a sample is to be added, the driving module 450 pushes the linkage member 410 again in the axial direction Y, so that the lower end of the piston rod 120 and the lower end of the piston tube 130 move from the first position P1 to the second position P2 again (as shown in FIG. 8). In this case, due to the downward movement of the piston rod 120 and the piston tube 130, the air in the air chamber 1122 is pushed out of the air chamber 1122 again, and then the liquid 21 in the tip 20 is pushed out of the tip 20 to achieve an action of pipetting.

Figure 9:
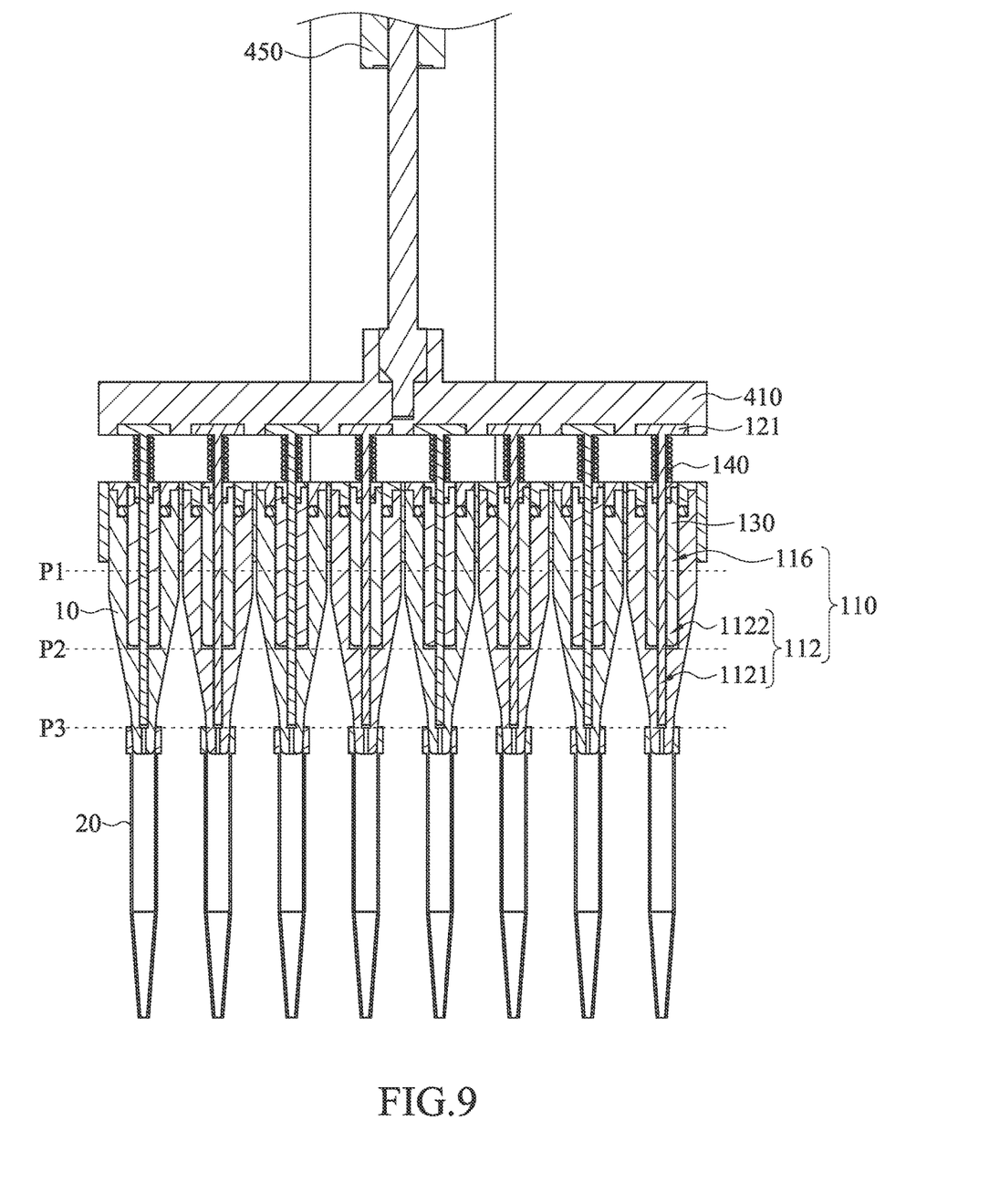
FIG. 9 is a schematic diagram of another moving pattern of the multi-channel pipetting assembly of FIG. 7.

Referring to FIG. 6, FIG. 8, and FIG. 9, when the driving module 450 continuously pushes the linkage member 410 in the axial direction Y, the piston rod 120 and the piston tube 130 move downward in the axial direction Y, so that after the lower end of the piston rod 120 and the lower end of the piston tube 130 move from the first position P1 to the second position P2, the lower end of the piston rod 120 is caused to protrude from the lower end of the piston tube 130 and to move from the second position P2 to a third position P3. Then, the driving module 450 maintains the linkage member 410 stationary, so that the lower end of the piston tube 130 is maintained at the second position P2, and the lower end of the piston rod 120 is maintained at the third position P3, as shown in FIG. 9. In this case, the elastic element 140 corresponding to the piston tube 130 is in a compressed state. Next, a bottom end of the tip 20 is placed in the liquid to be drawn up, and then the driving module 450 slowly pulls the linkage member 410 upward in the axial direction Y. As the linkage member 410 is slowly pulled upward in the axial direction Y, the piston rod 120 first moves upward in the axial direction Y to cause the lower end of the piston rod to return to the second position P2 from the third position P3, but the lower end of the piston tube 130 is maintained at the second position P2 due to the elastic force of the elastic element 140 (as shown in FIG. 8). That is, the piston rod 120 reciprocates once between the top and the bottom of the air chamber 1121. As the lower end of the piston rod 120 returns to the second position P2 from the third position P3, the air is drawn up back to the air chamber 1121, and therefore the liquid of a second volume corresponding to the volume of the air chamber 1121 is drawn up into the tip 20. After the multi-channel pipetting assembly 40 moves to an area to which a sample is to be added, the driving module 450 pushes the linkage member 410 again in the axial direction Y, so that the lower end of the piston rod 120 moves from the second position P2 to the third position P3 again (as shown in FIG. 9). In this case, due to the downward movement of the piston rod 120, the air in the air chamber 1121 is pushed out of the air chamber 1121 again, and then the liquid 21 in the tip 20 is pushed out of the tip 20 to achieve an action of pipetting.

Figure 10:
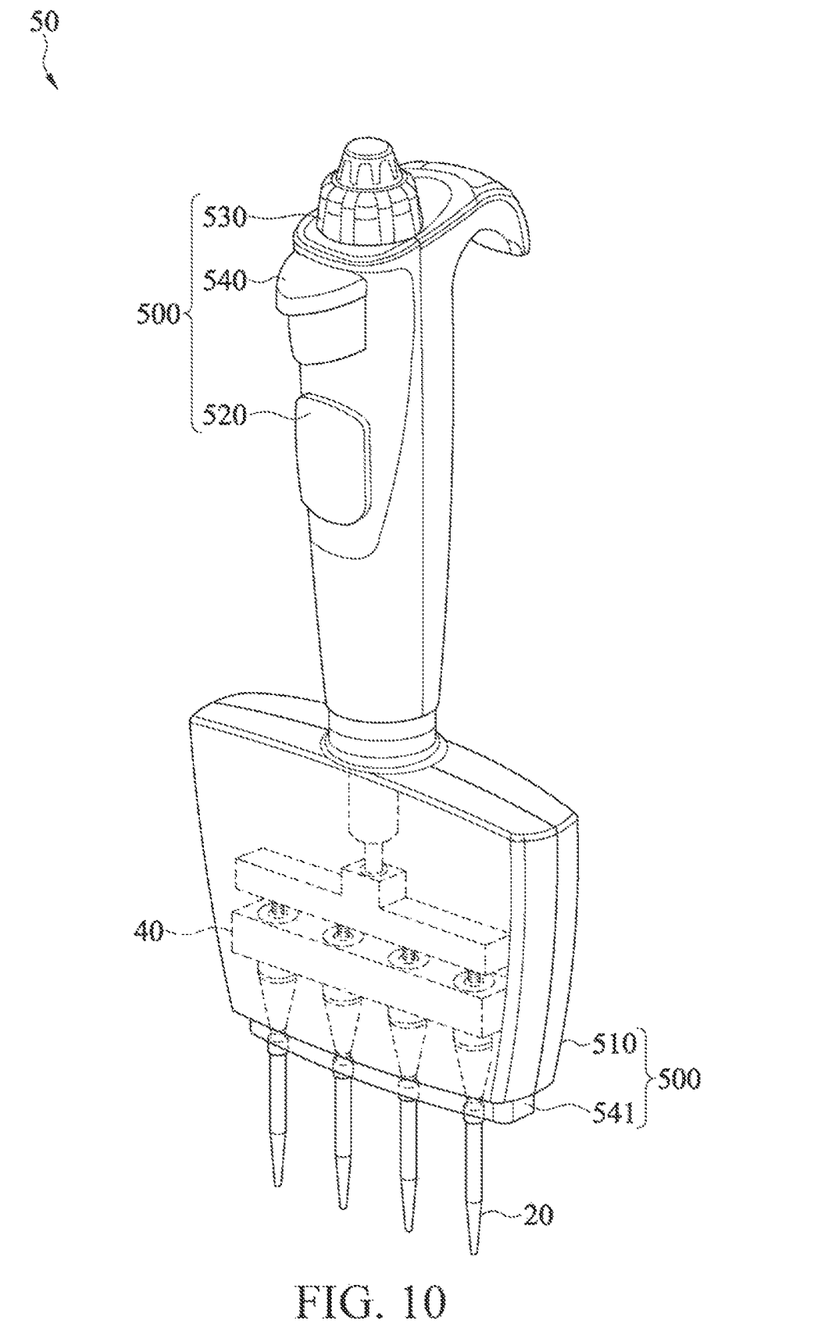
FIG. 10 is a schematic diagram of an application pattern of the multi-channel pipetting assembly of FIG. 6.

In some embodiments, referring to FIG. 10, the multi-channel pipetting assembly 40 of any of the above embodiments may be applied to a handheld multi-channel pipette 50. The handheld multi-channel pipette 50 may be electronic or mechanical. In an embodiment, referring to FIG. 6 and FIG. 10, the bracket 430 may be implemented by the housing 510 of the handheld body 500, and other assemblies of the multi-channel pipetting assembly 40 (that is, the pipetting structure 10, the linkage member 410, the driving module 450, or the like) are arranged inside the housing 510. In other words, the pipette bodies 110 of all pipetting structures 10 of the multi-channel pipetting assembly 40 are fixed to an inner side wall of the housing 510. The air outlet end 111 of the pipette body 110 protrudes from the housing 510 from an opening below the housing 510 and is exposed from the housing 510, so that the tip 20 can be sleeved. The linkage member 410 may reciprocate inside the housing 510 under the driving of the driving module 450.

The handheld body 500 has an operation switch 520 (for example, an electric button, a mechanical button, or the like), and the operation switch 520 is disposed on the housing 510. The operation switch 520 is coupled to the driving module 450 located inside the housing 510, and the driving module 450 may drive the linkage member 410 in response to enabling of the operation switch 520 (for example, being pressed by the user, or the like), thereby synchronously pushing the piston rods 120 of all of the pipetting structures 10.

The handheld body 500 further has an adjusting element 530 (for example, an adjusting button, an adjustment knob, or the like), and the adjusting element 530 is disposed on the housing 510. The adjusting element 530 is adapted to set the drawing amount. In an example, the driving module 450 may drive the linkage member 410 according to a set drawing amount in response to enabling of the operation switch 520 (for example, being pressed by the user, or the like). In another example, the adjusting element 530 may be coupled to a limiting assembly (not shown) located inside the housing 510, and the limiting assembly may limit the moving position and moving distance of the linkage member 410 according to the set drawing amount. The structure and operation of the limiting assembly are known to those skilled in the art, and therefore details are not described herein again. In an embodiment, the driving module 450 may be implemented by a motor 451 and a shaft 453. In another embodiment, the driving module 450 may be implemented by a conventional mechanism assembly.

In some embodiments, the handheld body 500 also has a remover button 540 and a tip remover 541. The remover button 540 is disposed on the housing 510, and the remover button 540 is coupled to the tip remover 541. A user may press the remover button 540 to drive the tip remover 541 to separate, from the air outlet end 111, the tip 20 sheathed outside the air outlet end 111 of the pipette body 110.

Figure 11:
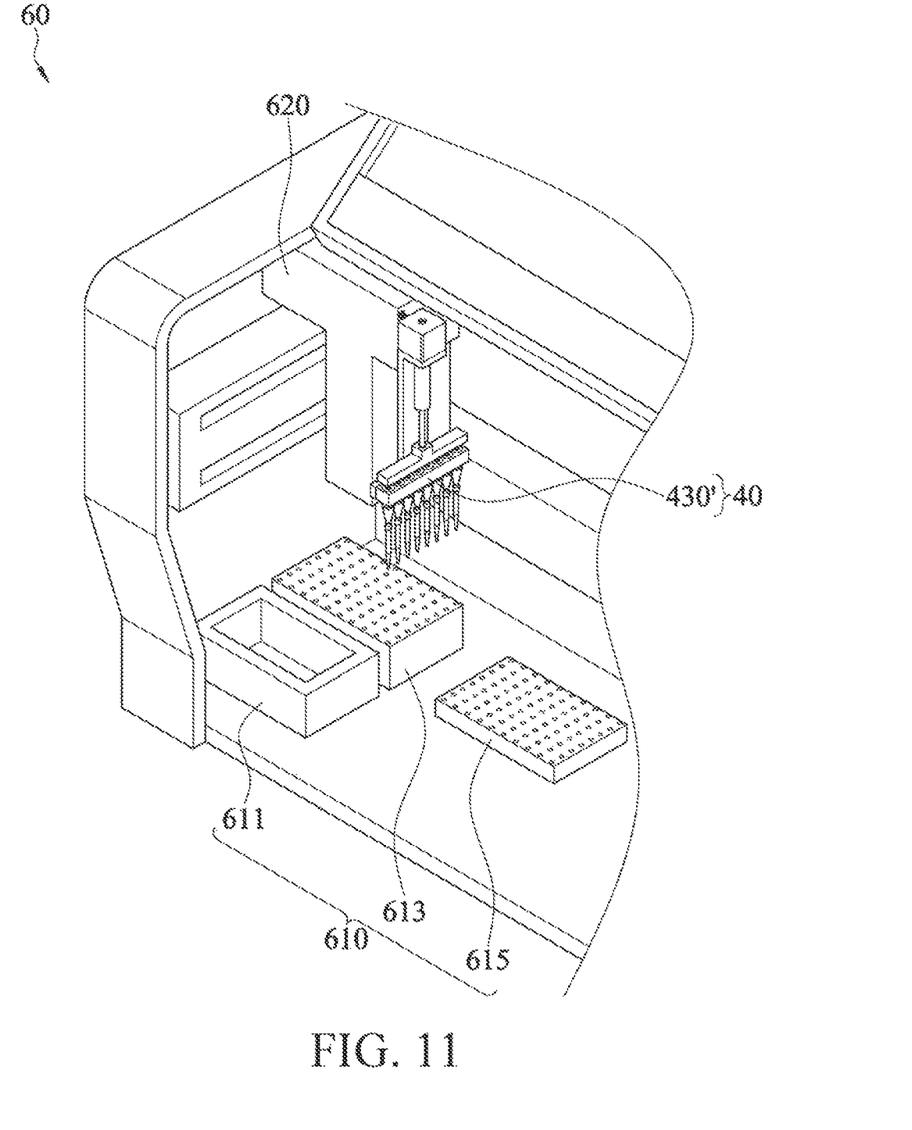
FIG. 11 is a schematic diagram of another application pattern of the multi-channel pipetting assembly of FIG. 6.

In some embodiments, referring to FIG. 11, the multi-channel pipetting assembly 40 of any of the above embodiments may also be applied to automated pipetting equipment 60. The automated pipetting equipment 60 is adapted for pipetting between a plurality of workbenches 610, and the automated pipetting equipment 60 includes a movable mechanism 620 and a multi-channel pipetting assembly 40.

In this embodiment, referring to FIG. 6 and FIG. 11, the bracket 430 is implemented by a housing 430', and other assemblies of the multi-channel pipetting assembly 40 (that is, the pipetting structure 10, the linkage member 410, the driving module 450, or the like) are arranged inside the housing 430'. In other words, the pipette bodies 110 of all pipetting structures 10 of the multi-channel pipetting assembly 40 are fixed to an inner side wall of the housing 430'. The air outlet end 111 of the pipette body 110 protrudes from the housing 430' from an opening below the housing 430' and is exposed from the housing 430', so that the tip 20 can be sleeved. The linkage member 410 may reciprocate inside the housing 430' under the driving of the driving module 450.

The housing 430' (that is, the bracket 430) is disposed on the movable mechanism 620. The movable mechanism 620 may drive the multi-channel pipetting assembly 40 to move between any two of the workbenches 610. In some embodiments, the workbenches 610 may be a reagent drawing platform 611, a tip arrangement platform 613, a reagent sample adding platform 615, a tip recovery platform, and the like.

In some embodiments, the movable mechanism 620 may be implemented by a driving motor and a movable track.

Based on the above, the automated pipetting equipment 60, the multi-channel pipetting assembly 40, or the pipetting structure 10 of any of the embodiments has a multiple-accuracy pipetting volume range to expand the volume range that meets the accuracy requirements, thereby avoiding assembling times and/or assembling errors for replacing pipettes by a user, and improving sample addition efficiency.

What is claimed is:

1. Automated pipetting equipment, adapted for pipetting between a plurality of workbenches, wherein the automated pipetting equipment comprises:
   a movable mechanism adapted to move between any two of the plurality of workbenches;
   a multi-channel pipetting assembly disposed on the movable mechanism and comprising:
   a bracket disposed on the movable mechanism;
   a linkage member; and
   a plurality of pipetting structures disposed on the bracket and the linkage member in parallel, wherein each of the pipetting structures comprises:
   a pipette body disposed on the bracket and including an air displacement tube and an air outlet end, wherein the air displacement tube is engaged with the air outlet end, the air displacement tube has a plurality of air chambers with different inner diameters, the plurality of air chambers are arranged axially according to the inner diameters and communicate with each other, the air outlet end is configured to be removably sleeved and coupled with a tip, the air outlet end has an air outlet passage, and the air outlet passage penetrates the air outlet end in the axial direction and communicates with the air chamber;

a piston rod fixed to the linkage member, being axially and reciprocatingly movable in the pipette body, the outer diameter of the piston rod being substantially equal to the inner diameter of the air chamber of the plurality of air chambers that has a smallest inner diameter;

at least one piston tube located in the pipette body, sleeved on the piston rod, the outer diameter of the at least one piston tube being substantially equal to the inner diameter of the remaining air chambers of the plurality of air chambers, and each being axially and reciprocatingly movable in the air displacement tube of the pipette body to enter or leave the matching air chamber; and at least one elastic element corresponding to the at least one piston tube and telescopically sleeved on the piston rod; and a driving module disposed on the movable mechanism and adapted to drive the linkage member to axially reciprocate.

2. The automated pipetting equipment according to claim 1, wherein one end of each of the elastic elements is fixed to the piston rod, and the other end of each of the elastic elements is fixed to the corresponding piston tube.

3. The automated pipetting equipment according to claim 2, wherein when a lower end of the piston rod moves in any of the remaining air chambers, the elastic element fixed to the piston tube corresponding to the air chamber maintains an original length.

4. The automated pipetting equipment according to claim 1, wherein in each of the pipetting structures, a sealing member is provided between an outermost side of the at least one piston tube and an inner wall of the pipette body.

5. The automated pipetting equipment according to claim 4, wherein a lower end of the pipette body is the air outlet end, and the sealing member is fixed to an upper end of the pipette body with a sealing cover.

6. The automated pipetting equipment according to claim 1, wherein in each of the pipetting structures, a sealing member is provided between any two of the at least one piston tube and the piston rod that are adjacent to each other.

7. The automated pipetting equipment according to claim 6, wherein each of the piston tubes comprises a piston body and a cover body, and the cover body fixes the sealing member to the piston body.

8. The automated pipetting equipment according to claim 1, wherein the piston rod comprises:
a piston section matching the air chamber of the plurality of air chambers that has the smallest inner diameter;
a fixing section fixed to the linkage member; and
a connecting section coupled between the piston section and the fixing section.

9. The automated pipetting equipment according to claim 1, wherein the driving module comprises:
a motor; and
a shaft connected between the motor and the linkage member.

10. A multi-channel pipetting assembly, comprising:
a linkage member; and
a plurality of pipetting structures disposed on the linkage member in parallel, wherein each of the pipetting structures comprises:
a pipette body including an air displacement tube and an air outlet end, wherein the air displacement tube is engaged with the air outlet end, the air displacement tube has a plurality of air chambers with different inner diameters, the plurality of air chambers are arranged axially according to the inner diameters and communicate with each other, the air outlet end is configured to be removably sleeved and coupled with a tip, the air outlet end has an air outlet passage, and the air outlet passage penetrates the air outlet end in the axial direction and communicates with the air chamber;
a piston rod fixed to the linkage member, located in the pipette body, being axially and reciprocatingly movable in the pipette body, the outer diameter of the piston rod being substantially equal to the inner diameter of the air chamber of the plurality of air chambers that has a smallest inner diameter;
at least one piston tube located in the pipette body, sleeved on the piston rod, the outer diameter of the at least one piston tube being substantially equal to the inner diameter of the remaining air chambers of the plurality of air chambers, and each being axially and reciprocatingly movable in the air displacement tube of the pipette body to enter or leave the matching air chamber; and
at least one elastic element corresponding to the at least one piston tube and telescopically sleeved on the piston rod.

11. The multi-channel pipetting assembly according to claim 10, wherein one end of each of the elastic elements is fixed to the piston rod, and the other end of each of the elastic elements is fixed to the corresponding piston tube.

12. The multi-channel pipetting assembly according to claim 11, wherein when a lower end of the piston rod moves in any of the remaining air chambers, the elastic element fixed to the piston tube corresponding to the air chamber maintains an original length.

13. The multi-channel pipetting assembly according to claim 10, wherein in each of the pipetting structures, a sealing member is provided between an outermost side of the at least one piston tube and an inner wall of the pipette body.

14. The multi-channel pipetting assembly according to claim 13, wherein a lower end of the pipette body is the air outlet end, and the sealing member is fixed to an upper end of the pipette body with a sealing cover.

15. The multi-channel pipetting assembly according to claim 10, wherein in each of the pipetting structures, a sealing member is provided between any two of the at least one piston tube and the piston rod that are adjacent to each other.

16. The multi-channel pipetting assembly according to claim 15, wherein each of the piston tubes comprises a piston body and a cover body, and the cover body fixes the sealing member to the piston body.

17. The multi-channel pipetting assembly according to claim 11, wherein the piston rod comprises:
a piston section matching the air chamber of the plurality of air chambers that has the smallest inner diameter;
a fixing section fixed to the linkage member; and
a connecting section coupled between the piston section and the fixing section.

* * * * *